United States Patent [19]
Ganti et al.

[11] Patent Number: 5,721,843
[45] Date of Patent: Feb. 24, 1998

[54] OPTIMIZING NETWORK UTILIZATION BY USING IMAGE RECONSTRUCTION TECHNIQUES

[75] Inventors: Girija Ganti; Minakanagurki V. Ranganath, both of Lincroft, N.J.

[73] Assignee: Lucent Technologies Inc., Murray Hill, N.J.

[21] Appl. No.: 522,041

[22] Filed: Aug. 31, 1995

[51] Int. Cl.[6] .......................... G06F 13/00; G06F 15/163
[52] U.S. Cl. ...................... 395/311; 395/800.29; 370/248
[58] Field of Search .................. 395/800, 200.3, 395/200.31, 200.12, 200.15, 200.68, 250.72, 250.02, 2.71, 182.02, 311, 312, 200.69, 200.71, 200.79, 280, 800.29; 364/437; 370/254, 255, 248, 400

[56] References Cited

U.S. PATENT DOCUMENTS

| | | | |
|---|---|---|---|
| 4,135,247 | 1/1979 | Gordon et al. | 378/11 |
| 4,739,476 | 4/1988 | Fiduccia | 395/800 |
| 4,931,941 | 6/1990 | Krishnan | 364/437 |
| 4,974,224 | 11/1990 | Boone | 370/400 |
| 5,121,231 | 6/1992 | Jenkins et al. | 359/7 |
| 5,128,525 | 7/1992 | Stearns et al. | 235/454 |
| 5,128,926 | 7/1992 | Perlman et al. | 370/248 |
| 5,274,643 | 12/1993 | Fisk | 370/238 |
| 5,323,470 | 6/1994 | Kara et al. | 382/103 |
| 5,430,719 | 7/1995 | Weisser, Jr. | 370/58.2 |
| 5,467,345 | 11/1995 | Cutler, Jr. et al. | 370/229 |
| 5,499,237 | 3/1996 | Richetta et al. | 370/400 |
| 5,572,512 | 11/1996 | Cutler, Jr. et al. | 370/248 |
| 5,574,827 | 11/1996 | Wang | 395/24 |
| 5,587,919 | 12/1996 | Cheng et al. | 364/488 |
| 5,590,120 | 12/1996 | Vaishnavi et al. | 370/254 |

OTHER PUBLICATIONS

C.M. Chen et al; "Parallelization of the EM Algorithim for 3–D Pet Image Reconstruction"; IEEE Transaction on Medical Image Dec. 1991.

Hsueh–JYH Li et al; "Image Interpretation and Prediction in Microwave Diversity Imaging"; IEEE Transaction on Geoscience and Remote Sensing. Jan. 1989.

John P. Kerr et al; "Spect Reconstruction Using a Back Propagation Neural Network implemented on a Massively Parallel SiMD Computer"; Computer Base Medical System May 1992.

"Algebraic Reconstruction Rechniques (ART) for Three–dimensional Electron Microscopy and X–ray Photography", by Richard Gordon, et al. Journal of Theoretical Biology, vol. 29, pp. 471–481, (1970).

Primary Examiner—Meng-Ai T. An
Attorney, Agent, or Firm—Steven R. Bartholomew

[57] ABSTRACT

In a communications network techniques are disclosed for optimizing node interconnection based upon the number of communications pathways to be provided by each of the nodes. For each node, the number of communications pathways to be provided by that node is represented in the form of a one-dimensional array. Image reconstruction techniques are applied to this one-dimensional array to generate a two-dimensional image. The one-dimensional array is used to generate vertical columns of the two-dimensional image, or alternatively, horizontal rows of the two-dimensional image. The two-dimensional image, comprised of a pixel array, is a mathematical representation of the communications network. Each pixel of the two-dimensional image represents a specific pair of nodes. Each pixel has a grayscale value that signifies the number of communications pathways that are to be provided between this specific pair of nodes. The image reconstruction technique may, but need not, consist of a generally known method such as, for example, filtered back projection, convolution back projection, algebraic reconstruction, or maximum likelihood reconstruction.

14 Claims, 5 Drawing Sheets

FIG. 1
NETWORK 100

OPTIMIZING NETWORK UTILIZATION BY USING IMAGE RECONSTRUCTION TECHNIQUES

BACKGROUND OF THE INVENTION

1. Field of the invention

This invention relates generally to communications networks, and more specifically to techniques for improving the utilization of elements within communications networks.

2. Background

Many existing communications networks consist of a plurality of interconnectable nodes. Each node includes a plurality of switching devices, and each switching device is equipped to provide a communications pathway between a pair of nodes. Such a communications network is used, for example, to provide long-distance telephone service throughout the United States. In order to efficiently utilize such a network, various network optimization techniques have been developed.

Techniques to improve network utilization techniques consider the problem of accurately predicting a set of node-to-node loading parameters from one or more sets of given loading parameters. One example of a loading parameter, termed a point-pair loading parameter or a switch-to-switch loading parameter, specifies the number of communications pathways (i.e., switch interconnections) that should be provided between each of a plurality of node pairs. Another type of loading parameter specifies the total number of communications pathways to be provided by each of a plurality of nodes. If specific values for a given type of loading parameter are known, these values can be used to forecast, predict, or estimate specific values representing another type of loading parameter. Oftentimes, it is desired to predict a set of point-pair loading parameters based upon an initial assumption specifying the total number of communications pathways to be provided by each of the nodes.

The prediction of node-to-node loading parameters is a complicated problem that frequently arises in the fields of communications network load forecasting and communications network capacity design. In order to accurately determine the required capacity for a given network, an accurate method of network load forecasting must be utilized. Unfortunately, no existing technique is available for accurately predicting a set of node-to-node loading parameters from a set of given (or previously-occurring) loading parameters. As a result, heavy demands are placed on computing resources. Moreover, existing techniques do not provide sufficient accuracy for many system applications.

SUMMARY OF THE INVENTION

In a communications network that includes a plurality of inter-connectable nodes, each node equipped to provide one or more communications pathways to each of one or more additional nodes, techniques are disclosed for improving node interconnection based upon the number of communications pathways to be provided by each of the nodes. For each node, the number of communications pathways to be provided by that node is represented in the form of a one-dimensional image projection, termed a projection bin. Each projection bin includes a numerical value specifying the number of connections to be provided between a given node and one other node. Image reconstruction techniques are applied to a one-dimensional image projection derived from a plurality of nodes to generate a two-dimensional image. The one-dimensional image projection is used to generate vertical columns of the two-dimensional image, and/or horizontal rows of the two-dimensional image.

The two-dimensional image, comprised of a pixel array, is a mathematical representation of the communications network. Each pixel of the two-dimensional image represents a specific pair of nodes. Each pixel has a gay-scale value that signifies the number of communications pathways that are to be provided between this specific pair of nodes. The image reconstruction technique may, but need not, consist of a generally known method such as, for example, filtered back projection, convolution back projection, algebraic reconstruction, maximum likelihood reconstruction, or maximum entropy reconstruction.

According to a further embodiment disclosed herein, once a first two-dimensional image has been generated from the one-dimensional image projection, the resolution of this image is iteratively increased by subdividing each pixel of the image into a plurality of pixels. A new one-dimensional image projection is extracted from the newly-subdivided image, and this projection is used to generate a second two-dimensional image having a greater pixel-by-pixel resolution than the first two-dimensional image. If desired, each pixel in the second two-dimensional image may be subdivided, and a third two-dimensional image generated. The foregoing procedure may be iteratively repeated until a desired level of network optimization accuracy is achieved.

DETAILED DESCRIPTION

Figure 1:
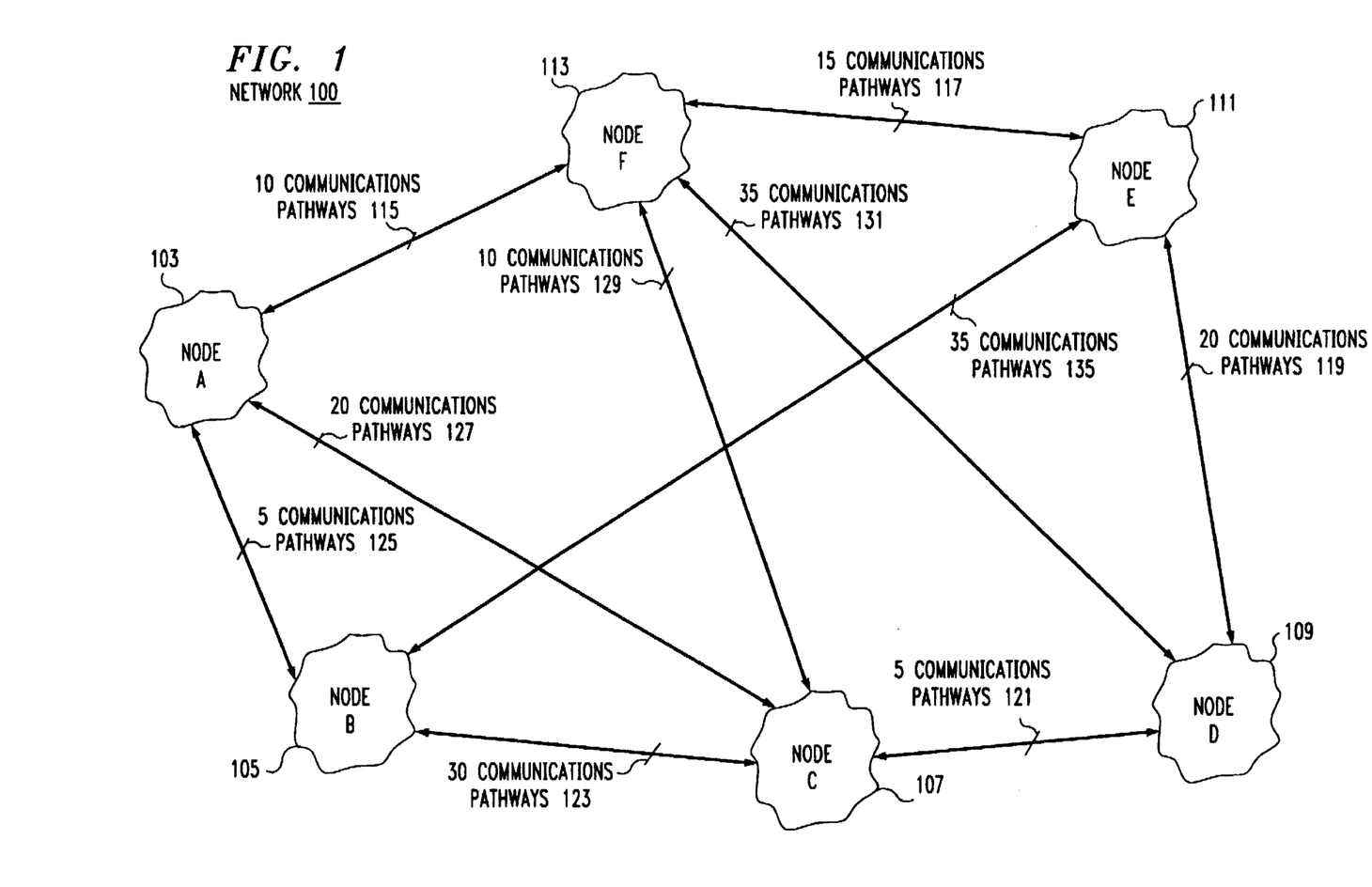
FIG. 1 is a diagrammatic representation of an existing full-duplex communications network having a plurality of nodes.

Refer now to FIG. 1 which is a diagrammatic representation of a communications network 100. Communications network 100 includes a plurality of nodes, such as node A 103, node B 105, node C 107, node D 109, node E 111, and node F 113. Each node 103, 105, 107, 109, 111, 113, respectively, includes a plurality of switching devices. Each of these switching devices selectively provides a communications pathway between a pair of nodes. In the example of FIG. 1, 10 communications pathways (reference numeral 115) are provided between node A 103 and node F 113. Fifteen communications pathways (reference numeral 117) are provided between node F 113 and node E 111, and 20 communications pathways (reference numeral 119) are provided between node E 111 and node D 109. Five communications pathways (reference numeral 125) are provided between node A 103 and node B 105, and 5 communications pathways (reference numeral 125) are provided between node D 109 and node C 107. Thirty communications pathways (reference numeral 123) are provided between node B 105 and node C 107, 20 communications pathways (reference numeral 127) are provided between node A 103 and node C 107, 35 communications pathways are provided between node B 105 and node E 111, 35 communications pathways (reference numeral 131) are provided between node C 107 and node F 113, and 10 communications pathways (reference numeral 129) are provided between node F 113 and node D 109.

Each communications pathway 115 117, 119, 121, 123, 125, 127, 129, 131, 135, respectively, may be conceptualized as a link, linking together a given pair of nodes. The total number of nodes in a network is represented by the variable N and, in the example of FIG. 1, N=6. The total number of communications pathways that are to be provided between a given pair of nodes is referred to as the link load for a given node pair. Note that the link load from node A 103 to node B 105 is 5. For purposes of the present example, all links are assumed to be bi-directional (equipped to communicate information in both directions), and, in such a case, the link load from node A 103 to node B 105 could also be specified as the link load from node B 105 to node A 103. However, the techniques described herein are applicable even in the case where some communications pathways are unidirectional. For example, if seven bi-directional (full-duplex) communications links are provided from node A 103 to node B 105, and four unidirectional communications links are provided from node A 103 to node B 105, then the link load from node A 103 to node B 105 is eleven, and the link load from node B 105 to node A 103 is seven.

Figure 2:
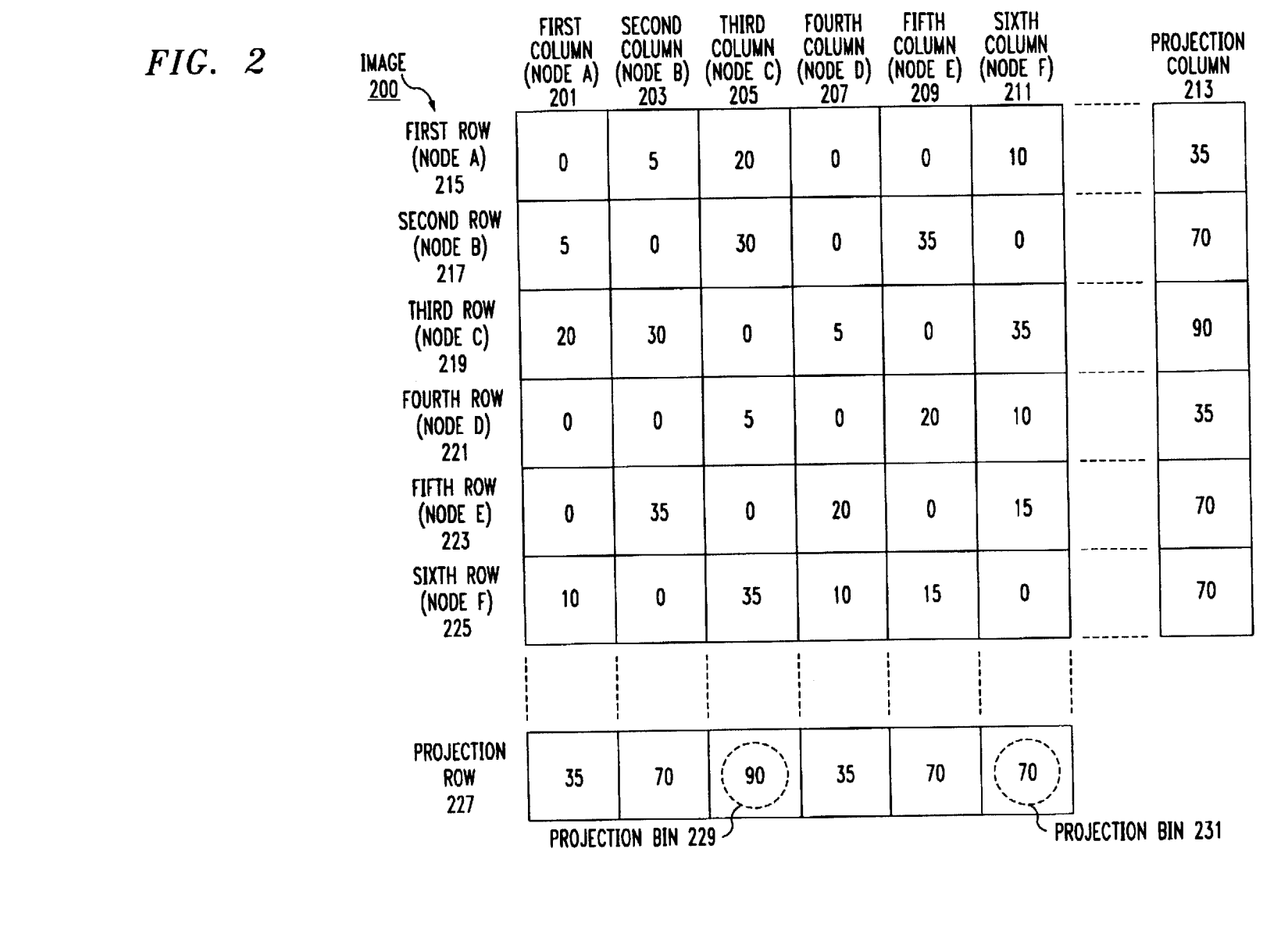
FIG. 2 is a two-dimensional image used to model the communications network of FIG. 1.

FIG. 2 is a two-dimensional image 200 used to represent the communications network 100 of FIG. 1. Two-dimensional image 200 consists of a pixel array of N×N pixels, where N is equal to the number of nodes in the communications network. Each pixel of the two-dimensional image represents a specific pair of nodes. Further, each pixel has a gray-scale value that signifies the number of communications pathways that are to be provided between this specific pair of nodes.

In the embodiment disclosed herein, the initial gray-scale value of each pixel need not be known to a high level of accuracy. An initial estimate of the gray-scale pixel values may be based upon, for example, previously-utilized network loading parameters for communications network 100. Since the number of communications paths to be provided to each of the nodes 103, 105, 107, 109, 111, 113 (FIG. 1) is known, the initial estimate of gray-scale pixel values may be based upon knowledge of such communications paths. The number of such communications paths may be obtained, for example, from previously-occurring communications network 100 usage patterns, from an initial best-guess estimate, from a forecast of future network usage based upon prior usage patterns, or from the hardware capabilities of each node 103, 105, 107 109, 111, 113, or from some combination of the aforementioned elements.

The number of communications paths to be provided by each of the nodes is loaded into a projection row 227. However, it is alternatively possible to use a projection column 213 instead of, or in addition to, the projection row. For example, assuming that a projection row 227 is utilized, then projection bin 229 represents the total number of communications paths to be provided by node C 107 (FIG. 1). Projection bin 231 (FIG. 2) represents the total number of communications paths to be provided by node F 113 (FIG. 1). Projection row 227 and projection column 213 may each be conceptualized as a one-dimensional array. Image 200 may be conceptualized as a two-dimensional array.

Image reconstruction techniques are applied to the values loaded into a projection row 227 (or, alternatively, a projection column 213, or, alternatively, both a projection row 227 and a projection column 213 (FIG. 2)) to generate pixel values for image 200. Even though these techniques are termed "image reconstruction" techniques, in the present case, these techniques are applied to generate an image 200 from the initial estimate of gray-scale pixel values referred to above. This initial estimate is typically a very rough estimate based upon past network usage, and the image 200 generated by image reconstruction sets forth network loading parameters that typically represent a more efficient utilization of communications network 100 relative to the initial estimate.

If desired, an initial estimate of image 200 may be prepared prior to determining values for the projection row 227 (or projection column 213). Once values for projection row 227 (or projection column 213) have been determined, image reconstruction techniques are then applied to the initial estimate of image 200 to generate pixel values using values from projection row 227 (or projection column 213). The pixel values generated in this manner provide an image 200 which represents an estimate or forecast for communications network 100 (FIG. 1). This estimate may be taken as the final estimate, or, alternatively, may be conceptualized as representing a new initial estimate from which a new image 200 will be reconstructed through an additional application of image reconstruction techniques to the projection bin values. The process of using a reconstructed image 200 as an initial estimate in preparing a further reconstructed image may be repeated iteratively to achieve a desired level of estimation accuracy, as will be describe din greater detail below.

Each pixel value in this newly-constructed image 200 represents the number of communications pathways to be provided from one specific node to another specific node in communications network 100 (FIG. 1). A suitable image reconstruction technique may include, for example, generally known methods such as filtered back projection, convolution back projection, algebraic reconstruction, maximum likelihood reconstruction, or maximum entropy reconstruction.

The pixel values of image 200 (FIG. 2) are mathematical representations of communications network 100 (FIG. 1). In the example of FIG. 2, the first row 215 of image 200 represents communications pathways provided by node A 103 (FIG. 1), the second row 217 (FIG. 2) represents communications pathways provided by node B 105 (FIG. 1), the third row 219 (FIG. 2) represents communications pathways provided by node C 107 (FIG. 1), the fourth row 221 (FIG. 2) represents communications pathways provided by node D 109 (FIG. 1), the fifth row 223 (FIG. 2) represents communications pathways provided by node E 111 (FIG. 1), and the sixth row 225 represents communications pathways provided by node F 113 (FIG. 1 ).

Also note that the first column 201 represents communications pathways provided by node A 103 (FIG. 1), the second column 203 (FIG. 2) represents communications pathways provided by node B 105 (FIG. 1), the third column 205 (FIG. 2) represents communications pathways provided by node C 107 (FIG. 1), the fourth column 207 (FIG. 2) represents communications pathways provided by node D 109 (FIG. 1), the fifth column 209 (FIG. 2) represents communications pathways provided by node E 111 (FIG. 1), and the sixth column 211 represents communications pathways provided by node F 113 (FIG. 1).

In the present example, the gay-scale value of the pixel at the intersection of the sixth column 211 and the third row 219 is proportional to the number of communications pathways (35) to be provided from node C 107 (FIG. 1) to node F 113 (FIG. 1). Note that the numerical values shown in the rows and columns of FIG. 2 represent the number of communications pathways to be provided from one specific node to another specific node, and these values would subsequently be converted into gray-scale values, for example, by using known normalization and/or scaling techniques. Gray-scale values may also be used to represent values stored in projection row 227 and/or projection column 213. Alternatively, the projection row 227 and/or projection column may be implemented by memory registers that store the actual (or scaled) number of communications pathways to be provided by each of the nodes.

In the case of a full-duplex communications network 100, signifying that each communications pathway (link) is bi-directional, note that image 200 contains redundant information. The image is symmetric about a diagonal line drawn from the pixel at the first row 215 of the first column 201, to the pixel at the sixth row 225 of the sixth column 211. The image of FIG. 2 shows this redundant information for illustrative purposes, and because it results in a square image which is relatively easy to process. However, it is alternatively possible for the redundant information to be eliminated, for example, by loading all pixels above (or below) the aforementioned diagonal line with zeroes or some other suitable value, or by truncating one of the redundant halves of the image. For a communications network having one or more unidirectional communications pathways (links), i.e., a non-full-duplex network, this redundancy does not, in general, exist. An example of an image generated from a non-full-duplex communications network will be described below in conjunction with FIG. 4.

After the projection row 227 (FIG. 2) (or projection column 213) is used to reconstruct an image 200, this image 200 represents an initial estimate of network node-to-node loading parameters for improving the interconnection of communications network 100 (FIG. 1). This initial estimate may be taken as the final estimate or, alternatively, additional iterations may be performed to predict a set of loading parameters having enhanced accuracy. These additional iterations may be performed using the same pixel-by-pixel resolution as was employed to generate the first two-dimensional image. However, as will be described in greater detail hereinafter, under some circumstances, it is advantageous to change the resolution of the two-dimensional image during successive iterations.

Once the image has been reconstructed, the loading parameters for the communications network 100 (FIG. 1) are derived by recalling that a pixel in image 200 (FIG. 2) is analogous to a given node-m-node link in the communications network, and that the gray level of a pixel is proportional to the relative number of communications paths to be provided over this node-to-node link. If a communications network has N nodes, then the number of communications pathways to be provided by each of N nodes is known, and this number is referred to as the node load value. Network parameters representing a total of N (N−1)/2 different node-to-node communications pathways (i.e., node-to-node link load values) are computed from the given N node load values.

Figure 3:
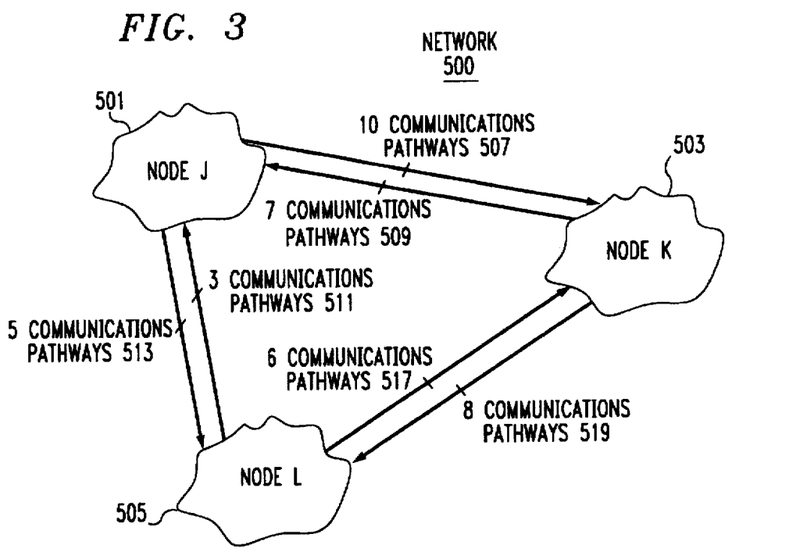
FIG. 3 is a diagrammatic representation of an existing non-full-duplex communications network having a plurality of nodes.

FIG. 3 is a diagrammatic representation of an existing non-full-duplex communications network 500 having a plurality of nodes including node J 501, node K 503, and node L 505. Ten unidirectional communications pathways (reference numeral 507) provide a communications link from node J 501 to node K 503, seven unidirectional communications pathways (reference numeral 509) provide a communications link from node K 503 to node J 501, six unidirectional communications pathways (reference numeral 517) provide a communications link from node L 505 to node K 503, eight unidirectional communications pathways (reference numeral 519) provide a communications link from node K 503 to node L 505, five unidirectional communications pathways (reference numeral 513) provide a communications link from node J 501 to node L 505, and three unidirectional communications pathways (reference numeral 511) provide a communications link from node L 505 to node J 501.

Figure 4:
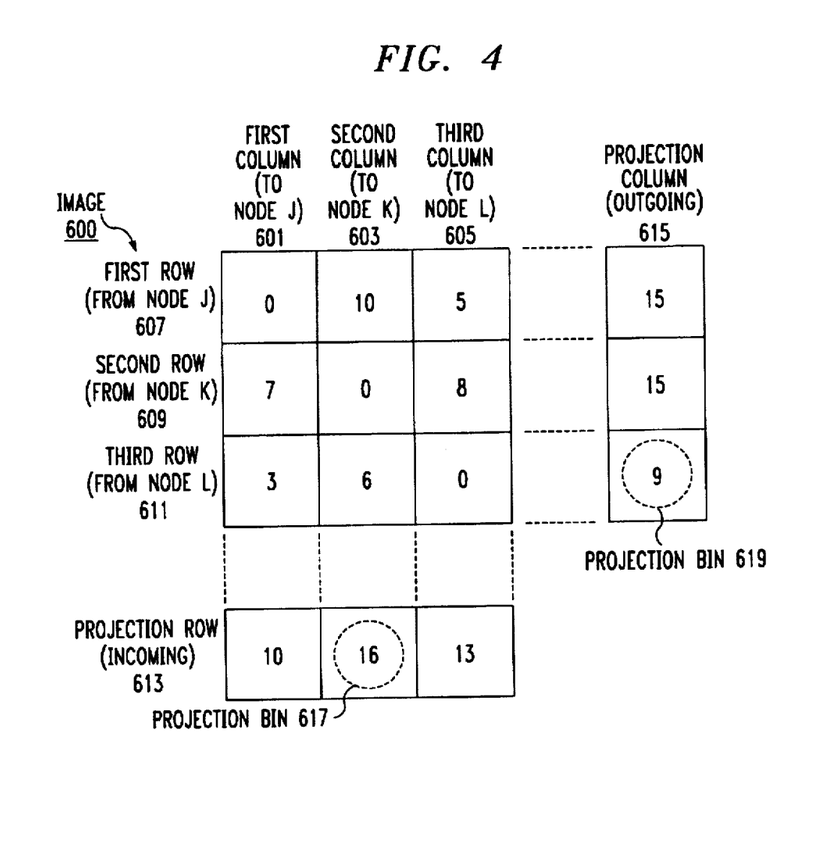
FIG. 4 is a two-dimensional image used to model the communications network of FIG. 3.

FIG. 4 is a two-dimensional image 600 used to model the communications network 500 of FIG. 3. Each row represents an ongoing communications pathway (i.e., link) from a given node to another node, and each column represents an incoming communications link to a given node from another node. For example, first column 601 represents all communications links coming into node J 501 (FIG. 3) from other nodes. Second column 603 (FIG. 4) represents communications links coming into node K 503 (FIG. 3) from other nodes, and third column 605 (FIG. 4) represents communications links coming into node L 505 (FIG. 3) from other nodes. First row 607 (FIG. 4) represents communications links from node J 501 (FIG. 3) to other nodes, second row 609 (FIG. 4) represents communications links from node K 503 (FIG. 3) to other nodes, and third row 611 (FIG. 4) represents communications links from node L 505 (FIG. 3) to other nodes.

Projection column 615 (FIG. 4) includes a plurality of projection bins, such as projection bin 619. Each projection bin 619 stores a numerical value representing a horizontal projection of image 600. In the present case, this projection is the sum total of all pixel values for the horizontal row in which the projection bin 619 is situated. For example, projection bin 619 represents the sum total of all outgoing communications links leaving node L 505 (FIG. 3). The projection bin column 615 represents the total number of outgoing communications links for each of the nodes, i.e., nodes J, K, and L (501, 503, 505 of FIG. 3, respectively).

Projection row 613 (FIG. 4) includes a plurality of projection bins, such as projection bin 617. Each projection bin 617 stores a numerical value representing a vertical projection of image 600. In the present case, this projection is the sum total of all pixel values for the vertical row in which the projection bin 617 is situated. For example, projection bin 617 represents the sum total of all outgoing communications links leaving node K 503 (FIG. 3). The projection row 613 represents the total number of incoming communications links for each of the nodes, i.e., nodes J, K, and L (501,503, 505 of FIG. 3, respectively).

One illustrative family of image reconstruction techniques that may be employed in the context of FIGS. 1, 2, 3, and 4 is known as Algebraic Reconstruction Techniques (ART). These techniques are explained in greater detail in a reference entitled, "Algebraic Reconstruction Techniques (ART) for Three-Dimensional Electron Microscopy and X-Ray Photography", published in the Journal of Theoretical Biology, Vol. 29, pages 471–481 (1970). However, according to two embodiments disclosed herein, these techniques are enhanced for use in the context of communications network optimization.

A first embodiment optimizes a communications network using a two-dimensional image having a fixed resolution of N pixels by N pixels, where N is the number of nodes in the communications network. This embodiment, termed the single-grid approach, can be applied either iteratively or non-iteratively. A second embodiment, termed the multi-grid approach, optimizes the communications network in an iterative manner by using a first pixel-by-pixel resolution in a first set of iterations, a second pixel-by-pixel resolution in a second set of iterations, and so on. The first set of iterations may include one or more iterations, the second set of iterations may include one or more iterations, and the number of iterations in the first set of iterations could, but need not, be equal to the number of iterations in the second set of iterations.

Figure 5:
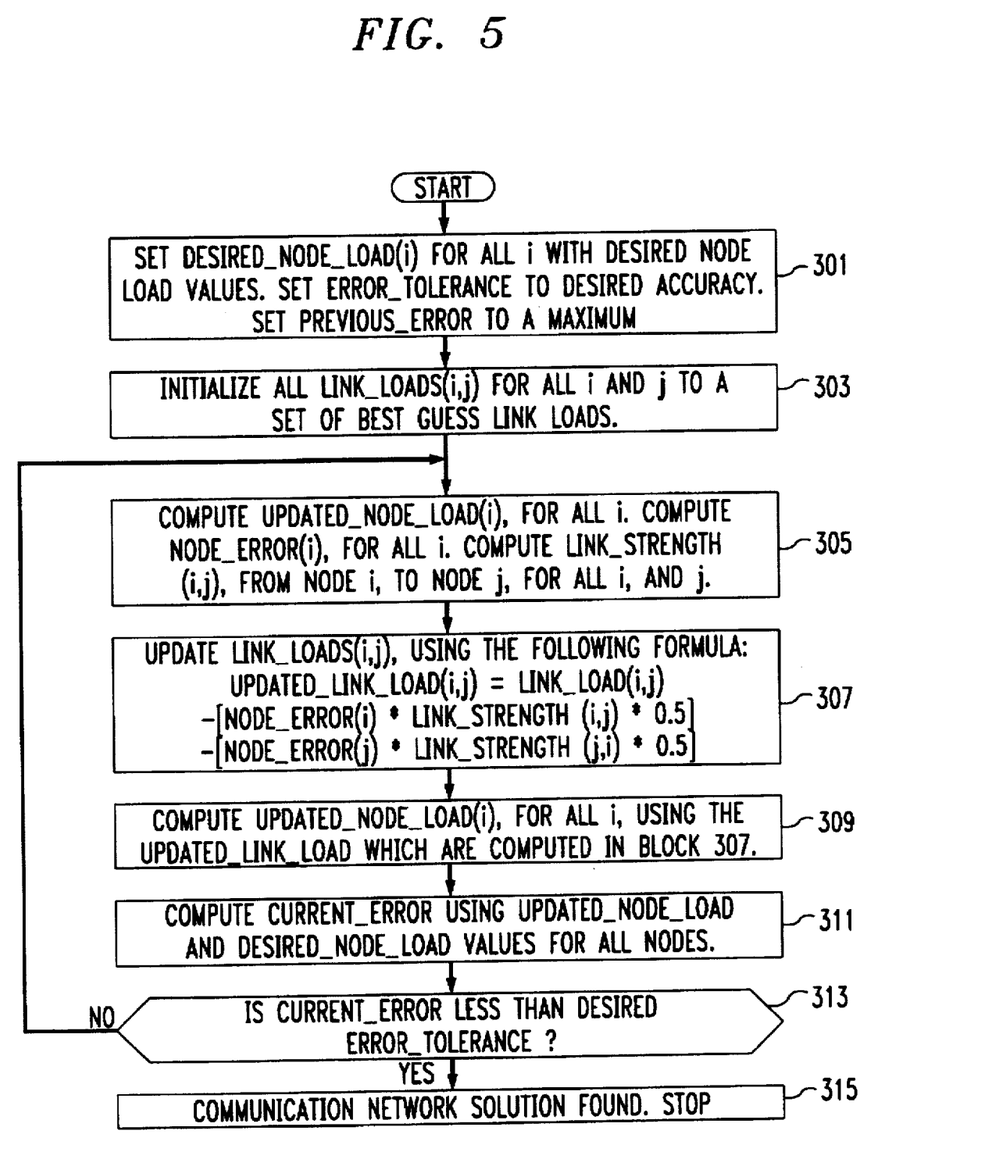
FIG. 5 is a software flowchart setting forth a single-grid operational sequence that predicts node loading parameters for the communications network of FIG. 1 and/or the communications network of FIG. 3.

The operational sequence implemented by the single-grid approach is described in FIG. 5. Note that the term "node-to-node link_load (i,j)" is defined as the load on the link connecting node i and node j. This load specifies the number of communications pathways that are to link node i with node j. The single-grid approach commences at block 301 by setting desired node_load(i) for all i with desired node load values. Error_tolerance is set to a desired accuracy. Previous error is set to an arbitrarily-selected maximum value. The error_tolerance and previous_error are defined as follows: error_tolerance is defined as the measure of accuracy which is desired for the forecasted network loading parameters. Ideally, if the number of connections to each node is specified initially, and the number of node-to-node pathways between each pair of nodes is to be estimated, then a perfect estimate will provide node-to-node interconnections such that the exact number of connections to each node as initially specified is actually provided by the estimated node-to-node interconnections. However, if the estimate is not accurate, then the estimated node-to-node interconnections will provide a greater or lesser number of connections to certain nodes than was initially specified.

By way of an example, if the error tolerance is set to 1.0, this means that the maximum allowable discrepancy is 1.0% between the computed node_load value and the desired node_load value for any given node. The error tolerance can be set to any desired number in accordance with the desired level of accuracy. Note that, as the number selected for error tolerance decreases, the desired accuracy level is increased.

There are several existing mathematical techniques that may be employed to compare the actual error of an estimate to the desired error tolerance for a given communications network. For example, least-squared error measurement, average absolute value error measurement, the maximum of absolute error over all nodes, and/or other error measurement techniques may be employed. The least squared error measurement is defined as:

$$\frac{\sum_{i=1}^{N}\left[\frac{\text{node\_load}(i)^{updated} - \text{desired node\_load}(i)}{\text{desired node\_load}(i)}\right]^2}{N}$$

The average absolute error measurement is defined as:

$$\frac{\sum_{i=1}^{N}\left|\left[\frac{\text{node\_load}(i)^{updated} - \text{desired node\_load}(i)}{\text{desired node\_load}(i)}\right]\right|}{N}$$

The maximum of absolute error over all nodes is defined as:

$$\max \text{ over } i \text{ nodes of}\left|\frac{\text{node\_load}(i) - \text{desired node\_load}(i)}{\text{desired node\_load}(i)}\right|$$

In addition to error_tolerance, two additional error parameters may be defined. One such parameter is previous_error, and another such parameter is current_error. The current_error is the error value computed in the current iteration. The previous_error is the error value computed in the previous iteration. The computation of current_error can be performed using various of the previously-mentioned techniques, such as the least squared error measurement, the average absolute error, or the maximum of absolute error.

At the commencement of the iteration process, i.e., at block 303, the previous_error parameter may be assigned an arbitrarily large value as, for example, 100.00. Next, at block 303, all link_loads (i,j) for all i and for all j are initialized to a set of previously-occurring or best-guess link loads. (Note that link_load (i,j) is equal to link_load (i,j) in the case of a bi-directional, full-duplex communications network which is assumed for purposes of the present example.)

Although it is possible to assume that the link loads are all equal to zero, or a constant non-zero value, corresponding to a completely blank image, or a uniform image, respectively, for image 200, the use of such an assumption is generally not warranted. In general, with an existing communications network 100 (FIG. 1), sufficient information about past network usage is available to provide a rough initial estimate for the link loads. Using this rough estimate in place of all zeroes typically enables a more accurate network solution to be obtained in a shorter period of time.

Rough estimates are generally well-suited for the purpose of initializing the link loads. For example, in the context of forecasting communications network utilization in the environment of the public switched telephone network, the link loads may be initialized by using values generated from network usage for the immediately preceding twelve months. Successive iterations will provide enhanced accuracy notwithstanding the accuracy of the initial estimate. However, in some circumstances, the solution for the communications network may be biased by this set of initial values, as will be described in greater detail below.

The node_load on node (i), which is the number of communications pathways to be provided by node i, should be equal to the sum of the link_loads that are incident upon node i. In other words, the node_load on a given node is equal to the sum of all communications pathways that are connected to that node. However, for computational purposes, a discrepancy is allowed to exist between the original node_load on node i and the computed node_load on node (i), which is the sum of N link_loads on node (i). The original node_load may represent a desired, an actual, an initial, and/or a target node_load. The maximum allowable amount of such a discrepancy, defined as an error tolerance, was set to an arbitrarily-selected value at block 303. By way of an example, this percentage error may be set to 1%, signifying that the maximum allowable error (termed error tolerance) is 1% between the original node_load and the computed node_load.

Updated node_load(i) are now computed at block 305 for all i by applying any of the aforementioned image reconstruction techniques to the image of FIG. 2 and/or the image of FIG. 4. Node_error is computed for all i. A link_strength (i,j) is now computed between node i and node j (block 305).

This link_strength is both defined and computed by the following formula:

$$\text{link\_strength}(i,j) = \frac{\text{link\_load}(i,j)}{\text{node\_load}(i)}$$

where node_load (i) is given by Σlink_load(i,j).

The node_load is the summation of link_loads (i,j) for all the links (communications pathways) incident on node i.

$$\text{link\_strength}(j,i) = \frac{\text{link\_load}(j,i)}{\text{node\_load}(j)}$$
$$= \frac{\text{link\_load}(i,j)}{\text{node\_load}(j)}.$$

It should be noted that link_strength (i,j) is not equal to link_strength (j,i).

The link_load (i,j) is now updated at block 307 using an iterative formula, link_load(i,j)updated=link_load(i,j)present—{(node error(i))*link_strength(i,j) *0.5}—{(node error (j))*link_strength(j,i)*0.5}, where node_error(i)= [computed node_load(i)—desired node_load(i)].

At block 309, compute node_load values using the updated link_load values as follows:

$$\text{node\_load }(i)^{updated} = \sum_j \text{link\_load }(i,j)^{updated}.$$

At block 311, compute the current_error between computed node_load(i) and desired node_load (i). This error may be termed the actual error of the estimate, and/or the computed error. Then determine whether or not this computed error is less than the desired error_tolerance set at block 301 for the node interconnections.

At block 313, the computed error determined in the immediately preceding step (block 311) is compared with the desired error_tolerance. If the computed error is lower than error_tolerance, then the solution—the set of forecasted network loading parameters—is found (block 315), and the iterative process ceases. If the computed error is greater than the error_tolerance, then the program loops back to block 305 to perform the step of calculating the link_strengths.

The foregoing method is called a single-grid approach because the resolution of the N pixel-by-N pixel array of image 200 (FIG. 2) is not changed in successive iterations. There may be inherent shortcomings with this approach if a highly accurate solution (low error tolerance) is required. During the iterative process, the computed error keeps decreasing as additional iterations are performed, up to a point. Beyond this point, the computed error may start increasing if additional iterations are performed. At this stage, the solution is said to be diverging. If the solution starts diverging, and if the computed error as described above is still greater than the desired error_tolerance, then it is not possible to find a solution for that desired accuracy using the single grid approach. Rather, a multi-grid approach to be described hereinafter is used to find a solution with the desired level of accuracy. The term grid refers to the pixel-by-pixel resolution used to reconstruct image 200 (FIG. 2). A multi-grid approach uses grids of increasing resolution during successive iterations, as is explained in more detail below.

In the multi-grid approach, a resolution parameter, called β, is defined as the pixel-by-pixel resolution of reconstructed image 200 (FIG. 2). The resolution parameter β referred to in the specification is identical to resolution parameter B set forth in FIGS. 5 and 6. Italicized parameters in the specification appear as non-italicized parameters in the drawings. From one iteration to the next, the value of β is changed, i.e., either increased or decreased. Decreased values of β signify a higher-resolution image 200, and increased values of β signify a lower-resolution image 200. As in the case of the single-grid approach, the multi-grid approach commences by setting desired node load for all i nodes with desired node_load values, setting error_tolerance to a desired accuracy, setting previous_error to an arbitrarily selected maximum value, and setting resolution parameter β to 1.0; specifying an N×N pixel array (block 401).

As was described above in the case of the single-grid approach, an appropriate value for the error_tolerance is selected. Note that this error parameter may be set to an arbitrary value, and that this value represents the desired accuracy of the solution specifying node interconnections for communications network 100.

Figure 6:
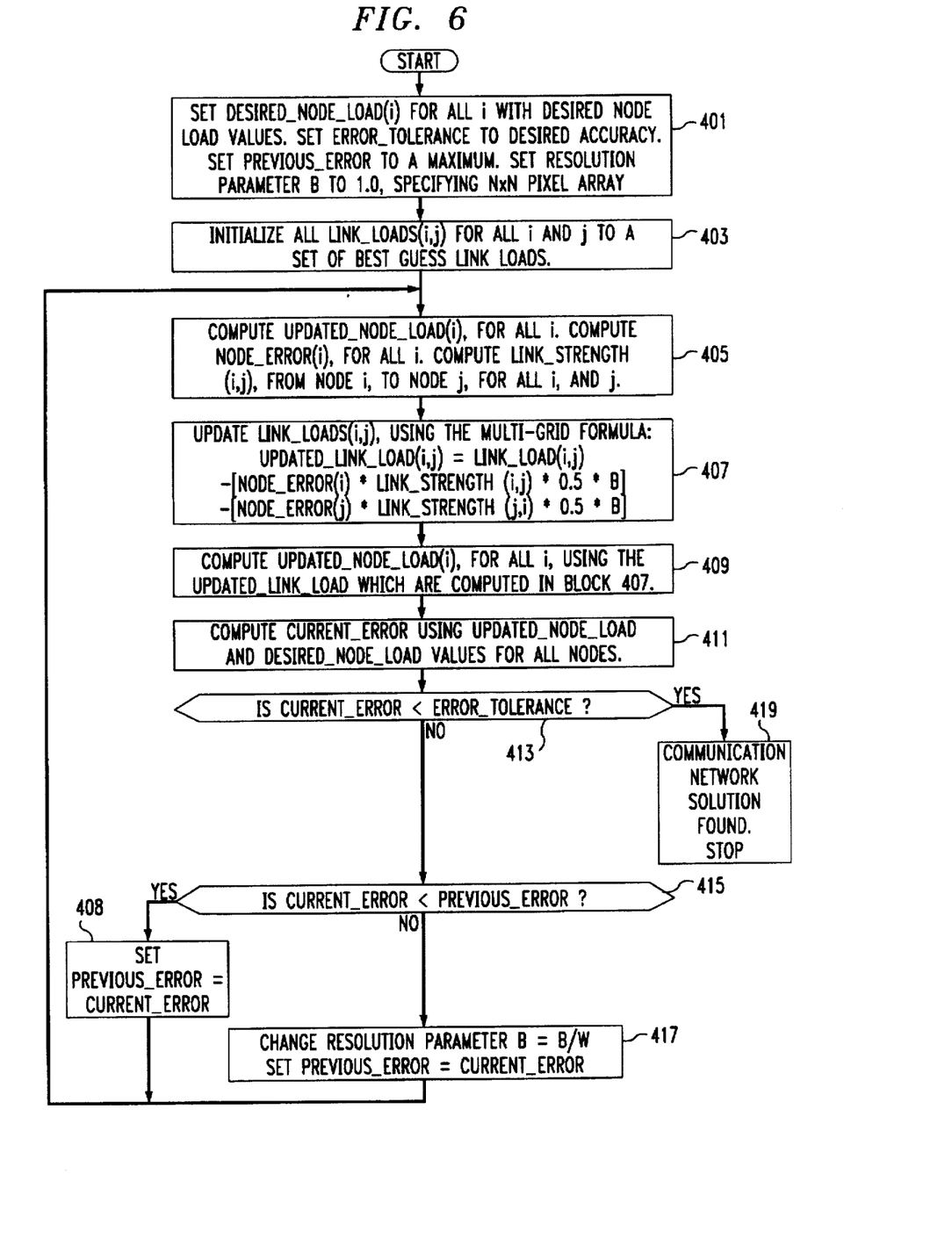
FIG. 6 is a software flowchart setting forth a multi-grid operational sequence that predicts node loading parameters for the communications network of FIG. 1 and/or the communications network of FIG. 3.

Next (block 403), all link_loads (i,j) for all i and for all j are initialized, to a set of previously-occurring, or best-guess link loads (FIG. 6, block 401).

As in the case of the single-grid approach, it is acceptable to use rough estimates for initializing these link loads. Updated_node_load(i) values are computed for all i using any of the aforementioned image reconstruction techniques (block 405). Node_error(i) is computed for all i. A link strength (i,j) is now computed between node i and node j (block 405). As was described previously in connection with the single-grid approach, link strength is computed as follows:

$$\text{link\_strength}(i,j) = \frac{\text{link\_load}(i,j)}{\text{node\_load}(i)}$$

where node_load (i) is given by Σ link_load(i,j).

Note that the number of communications pathways to be provided by each node is defined as the node_load value for that node, and that the node_load is the summation of link_load (i,j) for all the links (communications pathways) incident on node i:

$$\text{link\_strength}(j,i) = \frac{\text{link\_load}(j,i)}{\text{node\_load}(j)}$$

However, unlike the single-grid approach, updated link_load values are now computed at block 407 based on the following iterative formula:

link_load(i,j)updated=link_load(i,j)present—{link_strength(i,j)* node_error(i)*0.5*β}—{link_strength (j,i)*node_error(j)*0.5* β}.

At block 409, compute node_load values using the updated link_load values as follows:

$$\text{node\_load}(i)^{updated} = \sum_j \text{link\_load }(i,j)^{updated}.$$

Compute the current_error at block 411 using node_load updated values, as well as measured, desired, or target node_load values, and any of the formulas mentioned in connection with the single-grid approach described above.

At block 413, the current_error computed in the immediately preceding step (block 411) is compared with the error_tolerance. If the computed error is lower than error_tolerance, then the solution—the set of forecasted network loading parameters—is found (block 419), and the iterative process ceases. On the other hand, if the error_tolerance is less than the computed error, a check is performed to ascertain whether or not current_error is less than previous_error (block 415). If so, previous_error is set to current_error at block 408, and the program loops back to block 405. The negative branch from block 415 leads to block 417 where the resolution parameter $\beta$ is changed to $\beta/w$. Previous_error is set to current_error (also at block 417), and the program loops back to block 405. In the flowchart of FIG. 6, to make a determination as to whether or not $\beta$ should be changed, the error in the current iteration is compared with the error in the previous iteration. If the error in the current iteration is greater than the error in the previous iteration, then it implies that the solution started diverging. When the solution starts diverging, the resolution should be changed, i.e., increased. However, if the solution is not yet diverging, the resolution need not be changed.

If the resolution must be changed, the value of resolution parameter $\beta$ is changed by dividing $\beta$ by w (block 417). In the present case, it is desired to improve (increase) the resolution and, therefore, w is selected to be a number greater than 1.0. w can be set, for example, to 2.0. When w is greater than 1.0, it means that the resolution for the image 200 (FIG. 2) that corresponds to the communications network 100 (FIG. 1) has been increased by a factor of w. For example, if $\beta$ is 1 and w is 2, then the resolution of an image of N×N pixels would be increased to 2N×2N pixels. In other words, each pixel of the N pixel by N pixel image has been subdivided into four pixels. If each pixel of the N×N image has a dimension of 1 unit by 1 unit, then each pixel of the 2N×2N subdivided image has a dimension of one-half unit by one-half unit.

Although, in this example, resolution has been increased (by decreasing $\beta$), it is also possible to decrease the resolution in subsequent iterations. In the present case, when $\beta$ is decreased, this signifies that one or more successive iterations will now be performed using a higher resolution image, and the program loops back to block 405.

The error convergence properties of the single grid approach and the multi grid approach is relatively straightforward. As the number of iterations is increased beyond the first iteration, the error starts decreasing at first. This is true both for the multi-grid approach as well as for the single-grid approach. However, as an increasing number of iterations are performed, at some point, the error starts to increase. Therefore, there is an optimum number of iterations for which error is at a minimum, beyond which the error increases. If the multi-grid approach is used, the resolution should be increased immediately after the optimum number of iterations has been performed. After the resolution has been increased, subsequent iterations will, at first, show a decrease in error. However, once again, at some point during subsequent iterations, the error will start to increase. If the error is sufficiently low at this point, the iterative procedure can terminate here and the final iteration taken as the final solution for the communications network. On the other hand, if higher accuracy is still desired, the resolution can be increased once again and more iterations performed at this still higher resolution.

The single-grid and multi-grid algorithms mentioned above have been implemented for computing node-to-node (i.e., point-to-point) loads from given node capacity values in the AT&T 4ESS switched public telephone network. Presently-existing long-term forecasting processes for the 4E switched network present shortcomings. For some nodes (switches), these forecasting processes consistently over-forecast or under-forecast node utilization. This forecasting process is corrected using node usage data for the immediately preceding months (for example, for the last six months) that specifies actual node switch loads. By using this corrected forecasting process, the 4E switch loads are predicted for a short term such as, for example, the next three months. The corrected node (switch) loads for a given month are taken as a measured set of switch load (or node load) values, and the techniques described herein (single-grid or multi-grid approach) are used to compute the point-to-point load values for that month. Using the single-grid or the multi-grid approach, the node-to-node (point-to-point) loads for the 4E switched network are more accurate than the loads predicted using prior art long-term forecasting processes.

The decision as to whether a single-grid approach or a multi-grid approach is appropriate for a given situation may be based upon the following considerations. When the error_tolerance is relatively high, for example, 1%, signifying that one can accept a solution within 1% of the average absolute node error, then the single-grid approach is fine. However, one desires a solution having greater accuracy, i.e., the error_tolerance is lower than 1% for the average absolute node error, then the multi-grid version is probably preferred. Note that the single-grid approach is embedded in the multi-grid approach. As mentioned before in connection with the multi-grid approach, the resolution parameter $\beta$ is automatically adjusted depending on the accuracy desired for the solution. Therefore, in some cases, i.e., if the solution requires relatively low accuracy, then $\beta$ may not actually be adjusted, effectively resulting in an application of the single-grid approach.

Resolution parameter $\beta$ may have a value equal to or greater than 1.0. If $\beta$ is greater than 1.0, network parameters are predicted with a lower resolution image (i.e., grid). If $\beta$ is lower than 1.0, then network parameters are predicted in a higher-resolution grid.

Although an embodiment was described above which applies the same value of $\beta$ to the entire image 200 (FIG. 2), it is also possible to use a plurality of values for $\beta$ in the same iteration, and/or to use a different $\beta$ value for each line (horizontal row and/or vertical column) of image 200, and/or to use a different $\beta$ value for each pixel in the image. Such an approach may be desirable, for example, because certain node-to-node links may be especially critical, whereas other such links may be relatively non-critical. Therefore, this approach permits solving for network parameters using a low resolution for some nodes and a high resolution for other nodes. Note that this approach presents an additional advantage. For a given network parameter solution, each line (or pixel) in image 200 (FIG. 2) may be converging to the desired solution at a different rate. Forcing $\beta$ to be the same throughout the entire iteration and for all node-to-node communications pathways is sometimes disadvantageous. Some of the node-to-node links in the network may be very sensitive, in the sense that, by changing their link parameters slightly, it may affect the overall accuracy by increasing the computed error. In such a case, one should decrease the value used for $\beta$ to solve the problem at a higher resolution. On the other hand, some of the links may not be very sensitive to the overall accuracy. Then, the value of $\beta$ should be increased for that link. Controlling the $\beta$ value for every line (or pixel) in image 200 within a given iteration is analogous to solving an image reconstruction problem at different resolutions, where different portions of the image are solved at different resolutions.

In image reconstruction, an image is often reconstructed using a plurality of projection bin sets, and these projection bin sets may each represent one-dimensional projections measured at a plurality of angles with respect to the image.

Projection bin sets need not represent projections taken along strictly vertical or horizontal lines and may, in fact, represent projections taken along diagonal lines. Each set of projection bins represents one profile of an image taken along a specific direction or angle. Therefore, the profile data (the projection bins) potentially contain an extensive amount of data, and it is commonplace to have available almost as many projection bin sets as the number of pixels in the image to be reconstructed.

However, in node-to-node (point-to-point) load computation problems, only one or two projection bin sets are available, representing a projection in only one or two angles (i.e., horizontal and/or vertical directions). The number of node capacity values is very low compared to the number of communications pathway (link) values to be computed. That is, measured information is very limited compared to the link values to be computed. This implies the problem of node-to-node (point-to-point) load computation is analogous to a limited-angle image reconstruction problem. This signifies that the solution space is very open in the point-to-point load computation problem just as it is in limited-angle reconstruction problems. In these cases, the initial guess for the link values (or image pixel value in the image domain) is of some significance in determining the accuracy of the final solution for the network parameters.

In image reconstruction, in general, the initial guess for the pixel values is taken as zero across the entire image (i.e., a blank image as the initial guess). But, in limited angle reconstruction, the initial guess can be very important. It is necessary to include as much prior information about the image as is possible. Drawing an analogy to the operational environment of network communications, initial guess selection for the node-to-node (point-to-point) load computation problem can also be very crucial. The apriori information about the network is embedded in the long-term forecasting link values available from the forecasting process. These values may not be very accurate from a final solution perspective, but they do form a very good initial guess. As is the case in limited angle image reconstruction, the final solution is biased towards the initial guess. In load computation problems, the final solution is also biased towards the initial guess (i.e., the long-term network usage forecast) Therefore, the final solution is heavily based upon the network state in the past, as well as upon human perceptions related to network growth.

The Invention claimed is:

1. A method of operating a communications network having a plurality of inter-connectable nodes, each node equipped to provide a number of communications pathways to one or more additional nodes, with the number of communications pathways chosen by:
   (a) for each of a plurality of nodes, specifying a target node load equal to a desired number of communications pathways to be provided by that node;
   (b) placing the target node loads into a one-dimensional array;
   (c) applying an image reconstruction technique to generate a two-dimensional array from the one-dimensional array, the two-dimensional array comprised of a pixel array, each pixel representing a specific pair of nodes and having a pixel value related to the number of communications pathways to be provided between the specific pair of nodes.

2. A method of optimizing a communications network having a plurality of inter-connectable nodes, each node equipped to provide one or more communications pathways to one or more additional nodes, the method comprising the following steps:
   (a) for each of a plurality of nodes, specifying a target node load equal to the desired total number of communications pathways to be provided by that node;
   (b) placing the target node loads into a one-dimensional array;
   (c) applying an image reconstruction technique to generate a two-dimensional array from the one-dimensional array, the two-dimensional array comprised of a pixel array, each pixel representing a specific pair of nodes and having a pixel value signifying the number of communications pathways to be provide between the specific pair of nodes.

3. The method of claim 2 wherein the pixel values are gray-scale values signifying the number of communications pathways to be provided between the specific pair of nodes.

4. The method of claim 2 wherein the one-dimensional array is used to generate vertical columns of the two-dimensional array.

5. The method of claim 2 wherein the one-dimensional array is used to generate horizontal rows of the two-dimensional array.

6. The method of claim 2 wherein the image reconstruction technique comprises algebraic reconstruction.

7. The method of claim 2 wherein the image reconstruction technique comprises filtered back projection.

8. The method of claim 2 wherein the image reconstruction technique comprises convolution back projection.

9. The method of claim 2 wherein the image reconstruction technique comprises maximum likelihood reconstruction.

10. The method of claim 2 wherein the two-dimensional array generated in step (c) is used to generate a second one-dimensional array, and image reconstruction techniques are applied to the second one-dimensional array to generate a second two-dimensional array.

11. The method of claim 2 wherein, after the two-dimensional array has been generated from the one-dimensional array, resolution of the two-dimensional array is iteratively increased by subdividing each pixel of the two-dimensional array into a plurality of pixels.

12. The method of claim 11 wherein a new one-dimensional image projection is extracted from the subdivided two-dimensional array and used to generate a second two-dimensional image having a greater pixel-by-pixel resolution than the two-dimensional image prior to being subdivided.

13. The method of claim 12 wherein each pixel in the second two-dimensional image is subdivided to generate a third two-dimensional image, and the method of claim 11 is repeated iteratively until a desired level of network optimization is achieved.

14. In a communications network including a plurality of nodes, each node having a plurality of switches, each switch selectively providing a communications pathway between a pair of nodes, a method of predicting a set of node-to-node loading parameters from one or more sets of given loading parameters, the set of node-to-node loading parameters specifying, for each of a plurality of pairs of nodes, the number of communications pathways that are to be provided between the pair of nodes, the node-to-node loading parameters further specifying the total number of communications pathways to be provided by a given node, the method comprising the steps of:
   (a) representing the communications network as a one-dimensional image projection specifying the number of communications pathways to be provided to each of the nodes; and (b) applying an image reconstruction technique to the one-dimensional image projection to generate a two-dimensional image comprised of a pixel-by-pixel array, each pixel having a pixel value representing the number of communications pathways to be provided between a specific pair of nodes in the communications network.

* * * * *